US011520854B2

(12) United States Patent
Hao et al.

(10) Patent No.: US 11,520,854 B2
(45) Date of Patent: Dec. 6, 2022

(54) SUPPORT FOR DIFFERENT MATRIX MULTIPLICATIONS BY SELECTING ADDER TREE INTERMEDIATE RESULTS

(71) Applicant: Meta Platforms, Inc., Menlo Park, CA (US)

(72) Inventors: Yuchen Hao, Fremont, CA (US); Krishnakumar Narayanan Nair, Newark, CA (US); Ehsan Khish Ardestani Zadeh, San Jose, CA (US); Rakesh Komuravelli, Fremont, CA (US); Abdulkadir Utku Diril, Menlo Park, CA (US); Thomas Mark Ulrich, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 536 days.

(21) Appl. No.: 16/667,700

(22) Filed: Oct. 29, 2019

(65) Prior Publication Data
US 2021/0125044 A1 Apr. 29, 2021

(51) Int. Cl.
*G06F 17/16* (2006.01)
(52) U.S. Cl.
CPC .................... *G06F 17/16* (2013.01)
(58) Field of Classification Search
CPC .... H03M 13/09; H04L 1/0041; H04L 1/0061; H04L 45/7453; H04L 47/125
See application file for complete search history.

(56) References Cited

U.S. PATENT DOCUMENTS

| 2013/0262548 | A1* | 10/2013 | Ge | G06F 7/52 |
| | | | | 708/520 |
| 2018/0321938 | A1* | 11/2018 | Boswell | G06F 9/3012 |
| 2019/0227982 | A1 | 7/2019 | Abdallah | |
| 2019/0303749 | A1 | 10/2019 | Appuswamy | |

OTHER PUBLICATIONS

Extended European Search Report for European Application No. 20203634.9, dated Mar. 19, 2021, 08 Pages.
Office Action dated Jun. 14, 2022 for European Application No. 20203634.9, filed Oct. 23, 2020, 7 pages.

* cited by examiner

*Primary Examiner* — Guy J Lamarre
(74) *Attorney, Agent, or Firm* — Van Pelt, Yi & James LLP

(57) ABSTRACT

A first group of elements is element-wise multiplied with a second group of elements using a plurality of multipliers belonging to a matrix multiplication hardware unit. Results of the plurality of multipliers are added together using a hierarchical tree of adders belonging to the matrix multiplication hardware unit and a final result of the hierarchical tree of adders or any of a plurality of intermediate results of the hierarchical tree of adders is selectively provided for use in determining an output result matrix. A control unit is used to instruct the matrix multiplication hardware unit to perform a plurality of different matrix multiplications in parallel by using a combined matrix that includes elements of a plurality of different operand matrices and utilize one or more selected ones of the intermediate results of the hierarchical tree of adders for use in determining the output result matrix that includes different groups of elements representing different multiplication results corresponding to different ones of the different operand matrices.

20 Claims, 10 Drawing Sheets

SUPPORT FOR DIFFERENT MATRIX MULTIPLICATIONS BY SELECTING ADDER TREE INTERMEDIATE RESULTS

BACKGROUND OF THE INVENTION

Matrix multiplication is a central operation in many numerical algorithms used to solve various scientific and engineering computations. For example, matrix multiplication is an important component in artificial intelligence computations, such as inference. Since these computations are often demanding and data intensive, hardware solutions are often beneficial for improving performance. Computations can often be performed more quickly using hardware-based solutions that optimize the performance of various operations, e.g., matrix operations to support convolution. It is a technical challenge to create a hardware platform compatible with performing different matrix operations while also significantly improving performance and efficiency. Therefore, there exists a need for hardware and data path solutions that improve on the ability to efficiently perform operations without introducing significant complexity and restrictions.

BRIEF DESCRIPTION OF THE DRAWINGS

Various embodiments of the invention are disclosed in the following detailed description and the accompanying drawings.

FIG. 5b is a diagram illustrating an example of a combined matrix in accordance with the process of FIG. 5a.

DETAILED DESCRIPTION

Figure 1:
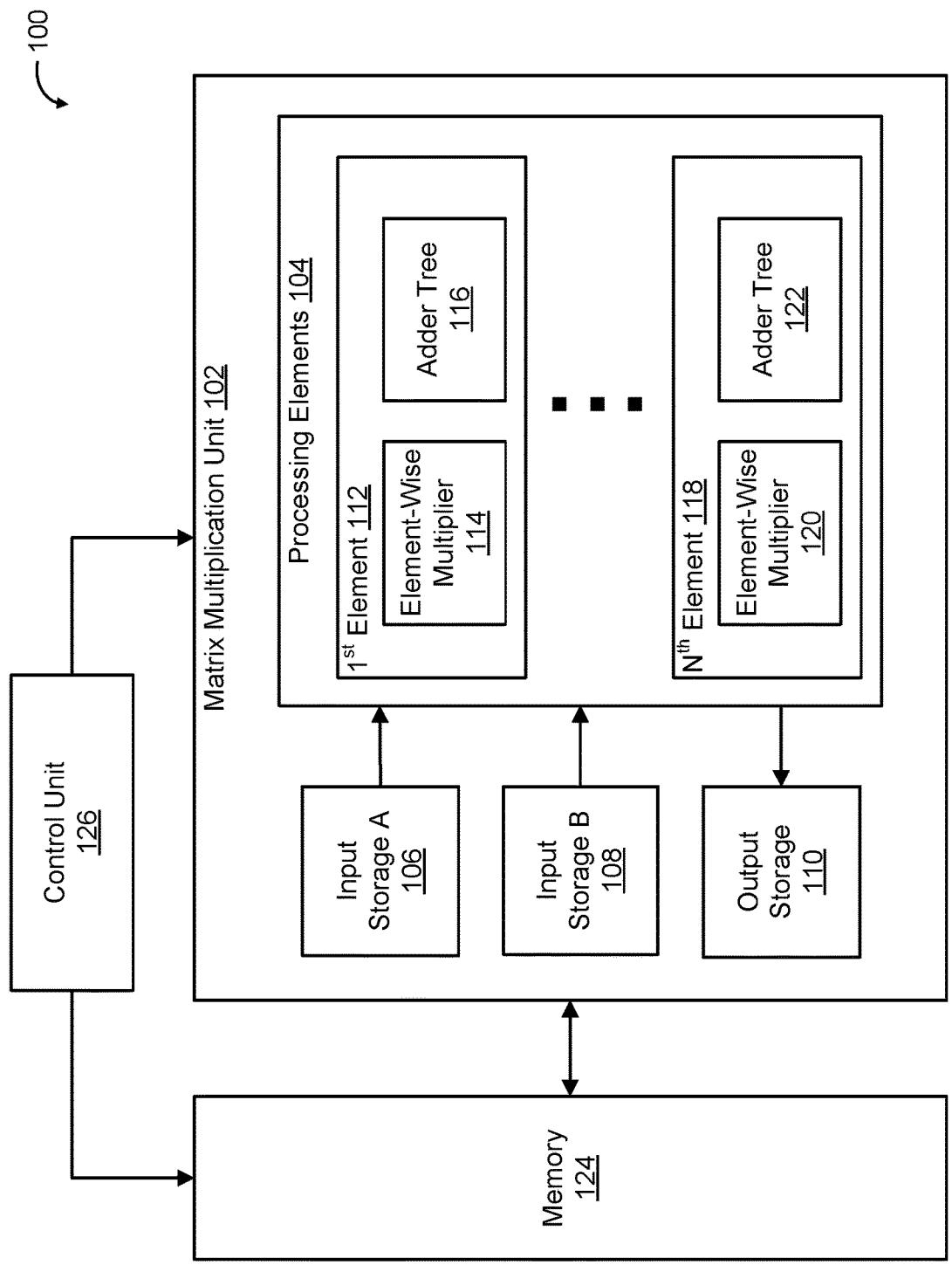
FIG. 1 is a block diagram illustrating an embodiment of a system for performing matrix multiplication using dot product operations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for performing matrix multiplication in hardware that includes support for various size inputs is disclosed. The disclosed system includes a matrix multiplication hardware unit comprising a plurality of multipliers configured to element-wise multiply a first group of elements with a second group of elements and a hierarchical tree of adders configured to add together results of the plurality of multipliers and selectively provide a final result of the hierarchical tree of adders or any of a plurality of intermediate results of the hierarchical tree of adders for use in determining an output result matrix. The disclosed system further includes a control unit configured to instruct the matrix multiplication hardware unit to perform a plurality of different matrix multiplications in parallel by using a combined matrix that includes elements of a plurality of different operand matrices and utilize one or more selected ones of the intermediate results of the hierarchical tree of adders for use in determining the output result matrix that includes different groups of elements representing different multiplication results corresponding to different ones of the different operand matrices. Practical and technological benefit of the disclosed system include improved computational and power efficiency and reduced data fragmentation when performing matrix multiplication.

Matrix multiplication is an important component in many types of computations, e.g., artificial intelligence computations such as inference. In various embodiments, matrix multiplication is used to perform various types of convolutions. Matrix multiplication can be performed by using hardware that performs dot product operations (e.g., a dot product engine). Stated alternatively, a dot product engine can be used to compute different variants of convolutions. In various embodiments, the dot product engine requires large enough inputs (e.g., large enough input channels and output channels) to be efficient. Insufficiently large inputs can lead to low utilization and output fragmentation, which requires more hardware resources to remove gaps in the output.

Groupwise convolution, which is a common building block in modern deep learning neural networks is oftentimes associated with limited input channels and output channels per convolution group. When the number of input channels and/or output channels is smaller than a specified size for which the dot product engine is configured, the overall efficiency of the dot product engine can drop and the output of the convolution can become fragmented in memory. Reorganizing the fragmented output uses more hardware resources. In various embodiments, the output is an output of a layer in a neural network and the output is fed to a next layer. The problem of fragmentation can be particularly significant for neural networks in which many layers have limited input channels and/or output channels (e.g., computer vision neural networks).

As described in further detail herein, in various embodiments, the dot product engine is logically partitioned by pulling out intermediate results from an adder tree so that input activations and weights from multiple groups can be fed to the dot product engine at the same time and computed independently. Benefits of this approach include improved dot product engine efficiency and more tightly packed (less fragmented) output tensors. Stated alternatively, a benefit is improved efficiency of groupwise convolution with small input and output channel sizes.

FIG. 1 is a block diagram illustrating an embodiment of a system for performing matrix multiplication using dot product operations. Matrix multiplication system 100 includes matrix multiplication unit 102, memory 124, and control unit 126. In the example shown, matrix multiplication unit 102 includes input storage A 106, input storage B 108, and output storage 110. In some embodiments, input storage A 106, input storage B 108, and output storage 110 are implemented as groups of hardware registers, such as flip-flop circuits. In some embodiments, input storage A 106 stores a first group of elements of to be element-wise multiplied with a second group of elements and input storage B 108 stores the second group of elements. In some embodiments, the first group of elements are values of an input matrix (e.g., input activations) and the second group of elements are values of weights of one or more convolution filters (or vice versa with respect to what is stored in input storage A 106 and input storage B 108).

In various embodiments, output storage 110 stores a result produced by processing elements 104. The example shown is illustrative and not restrictive. For example, input storage A 106, input storage B 108, and output storage 110 may be implemented as a single group of the same type of registers. Furthermore, no additional storage for the output of processing elements 104 may be needed if the output is written to (and thus overwrites) the registers used to store the groups of elements to be element-wise multiplied.

In the example shown, matrix multiplication unit 102 include processing elements 104 and processing elements 104 includes a first element 112 through an nth element 118. In various embodiments, each element of processing elements 104 performs a dot product operation. Having multiple elements (e.g., in parallel) allows for multiple dot product operations to be performed concurrently. In some embodiments, input storage A 106, input storage B 108, and output storage 110 store the various elements to be multiplied and the output elements for all of the parallel dot product operations. In the example illustrated, each element of processing elements 104 includes an element-wise multiplier and an adder tree. For example, first element 112 includes element-wise multiplier 114 and adder tree 116 and nth element 118 includes element-wise multiplier 120 and adder tree 122.

In various embodiments, each element-wise multiplier includes a plurality of individual multipliers. For example, if matrix multiplication unit 102 is configured to perform 32-element dot products, each element-wise multiplier includes 32 individual multipliers (e.g., see FIG. 2c and FIG. 4). The specific type of multiplier depends on the format of the values to be multiplied. Examples of formats include unsigned integers, signed integers, various floating-point number formats, and so forth for various bit sizes (e.g., 8-bit, 16-bit, etc.). Various multiplier implementations known in the art may be used (e.g., serial multipliers, pipelined multipliers, combinatorial multipliers, etc.).

In various embodiments, each adder tree is configured to add together results of the plurality of multipliers. For example, if 32 values are element-wise multiplied, the adder tree can produce an output that is the sum of 32 values. In various embodiments, the adder tree is hierarchical and includes a number of levels equal to $\log_2 N$, where N is the number of elements to be summed. In some embodiments, the output of the adder tree is stored in output storage 110. In various embodiments, each adder in the adder tree is implemented using basic digital logic gates. As described in further detail herein, in various embodiments, each adder tree is configured to selectively provide a final result of the adder tree or any of one or more intermediate results of the adder tree to support groupwise convolution (e.g., see FIG. 4). Matrix multiplication system 100 may be configured for various types of convolution (e.g., normal, groupwise, etc.). In various embodiments, matrix multiplication system 100 is configured to adapt to the type of convolution being performed (e.g., based on data parameters associated with the type of convolution) in order to improve efficiency.

In the example illustrated, memory 124 is coupled to matrix multiplication unit 102. In some embodiments, data stored in input storage A 106 and/or input storage B 108 is loaded from memory 124. In various embodiments, an output produced by processing elements 104 is written back to memory 124. The output result may first be stored in output storage 110. Examples of memory 124 include non-volatile memory (e.g., flash memory, various types of read-only memory, etc.), volatile memory (e.g., various types of random-access memory), or any other type of memory.

In the example illustrated, control unit 126 is coupled to matrix multiplication unit 102 and memory 124. In various embodiments, control unit 126 is implemented using digital electronic circuits (e.g., assemblies of digital logic gates printed on an integrated circuit). Control unit 126 directs the transfer of data from memory 124 to and from matrix multiplication unit 102 (e.g., to input storage A 106 and input storage B 108 and from output storage 110). In various embodiments, control unit 126 instructs matrix multiplication unit 102 to perform a plurality of different matrix multiplications in parallel by using a combined matrix that includes elements of a plurality of different operand matrices (e.g., see FIG. 3c) and utilize one or more selected ones of the intermediate results of a hierarchical tree of adders for use in determining an output result matrix that includes different groups of elements representing different multiplication results corresponding to different ones of the different operand matrices (e.g., see FIG. 4). Stated alternatively, as described in further detail herein, in various embodiments, control unit 126 directs matrix multiplication unit 102 to provide either a final result of an adder tree or any of one or more intermediate results of the adder tree to support groupwise convolution. As used herein, the final result of the adder tree refers to the output of the single adder in the last level of the adder tree. In some embodiments, controlling which result to provide includes supplying control signals to a plurality of multiplexers and/or demultiplexers (e.g., see FIG. 4).

In the example illustrated in FIG. 1, portions of the communication path between the components are shown. Other communication paths may exist, and the example of FIG. 1 has been simplified to illustrate the example clearly. For example, control signals are not shown explicitly in FIG. 1. Furthermore, not all connections between storage elements and memory are shown. Although single instances of components have been shown to simplify the diagram, additional instances of any of the components shown in FIG. 1 may exist. The number of components and the connections shown in FIG. 1 are merely illustrative. For example, additional instances of internal storage may exist. Components not shown in FIG. 1 may also exist.

Figure 2A:
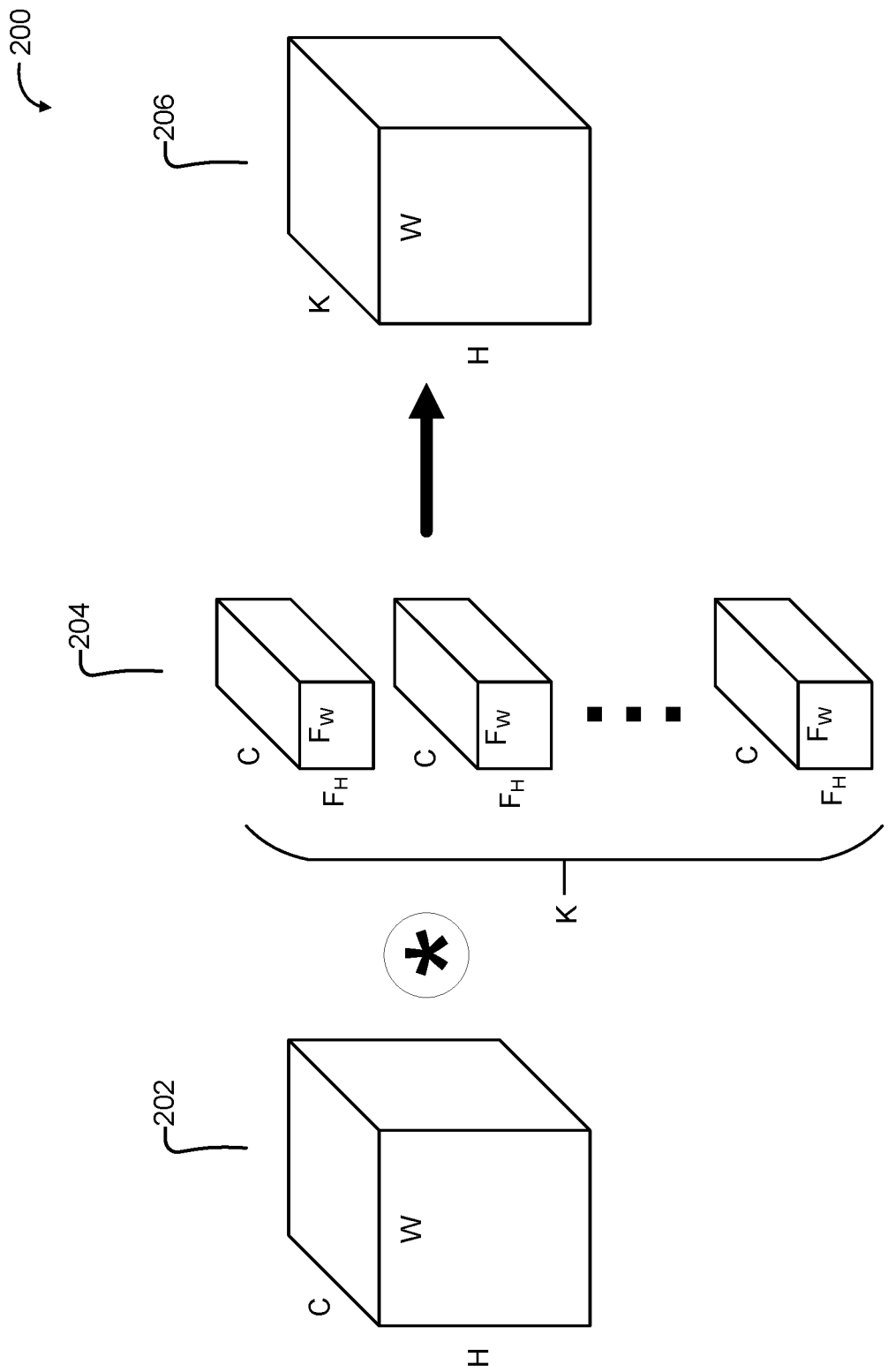
FIG. 2a is a diagram illustrating example data parameters associated with convolution.

FIG. 2a is a diagram illustrating example data parameters associated with convolution. In the example illustrated, convolution 200 includes convolving input 202 with filters 204 to produce output 206. Input 202 may be a three-dimensional image with height (H), width (W), and channel (C) dimensions. C is also referred to herein as the number of input channels. The channel dimension can be comprised of various data types. For example, an input may have three channels for the colors red, green, and blue (or more channels for more colors, and so forth; the number of channels can be much larger than three). Channels can also correspond to other data types. In the example illustrated, input 202 is convolved with each of K number of filters. Each filter has dimensions of $F_H \times F_W \times C$ where $F_H$ is the filter height, $F_W$ is the filter width, and C is the same number of channels as in input 202. Convolution 100 reduces the C dimension so that the C dimension is not present in output 206. In the example shown, output 206 has the same height and width as input 202. The depth of output 206 is K (the number of filters, which is also referred to herein as the number of output channels) because each filter in filter 204 reduces input 202 along the C dimension and creates a separate H×W image for each filter.

Figure 2B:
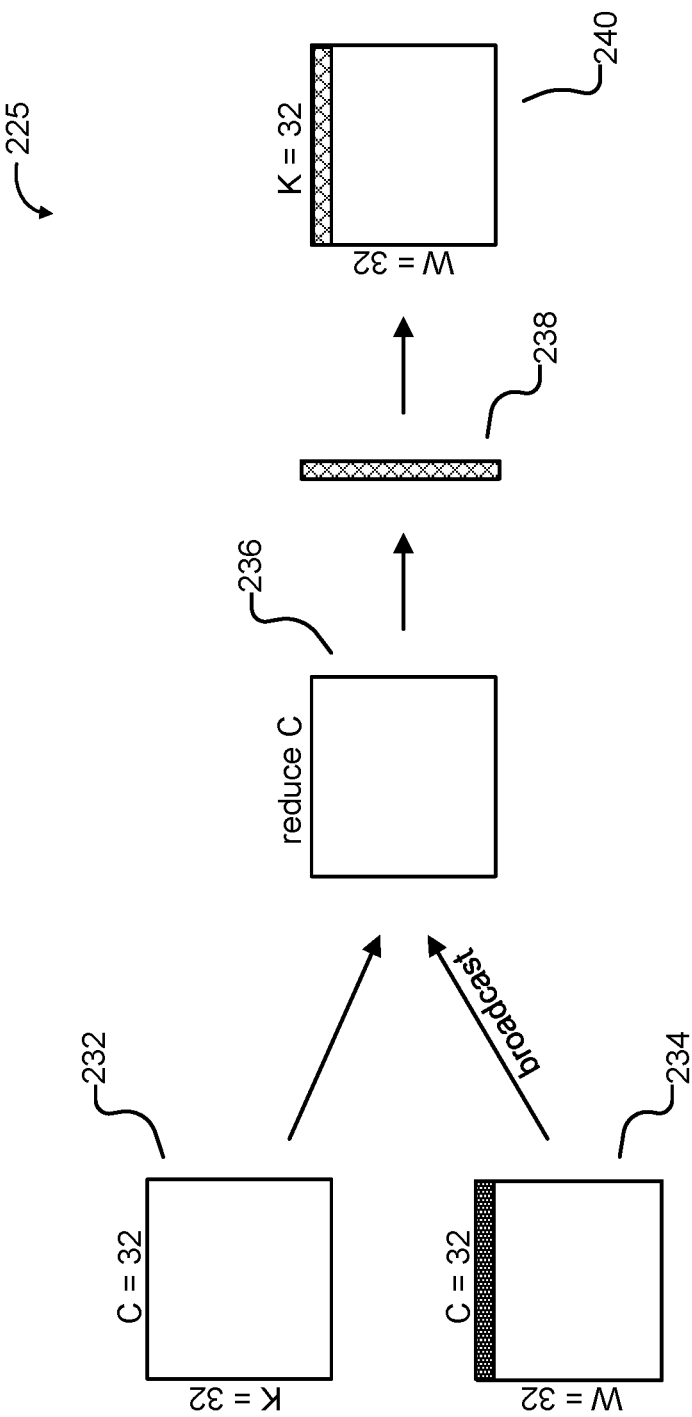
FIG. 2b is a diagram illustrating an example reduction of a data dimension associated with convolution performed via matrix multiplication.

FIG. 2b is a diagram illustrating an example reduction of a data dimension associated with convolution performed via matrix multiplication. In some embodiments, the reduction is performed by matrix multiplication system 100 when it is configured to handle normal convolution (as opposed to groupwise convolution). Filter values (e.g., associated with filters 204 of FIG. 2a) may be loaded into input storage A 106 of FIG. 1. These filter values are also referred to herein as weights. Input values (e.g., associated with input 202 of FIG. 2a) may be loaded into input storage B 108 of FIG. 1. These input values are also referred to herein as activations. Either input storage A 106 or input storage B 108 of FIG. 1 may be used for either weights or activations.

In some embodiments, a 32×32 square of filter values is loaded into storage 232 and a 1×32 row of activations in storage 234 is broadcasted into math engine 236 to perform reduction 225 (e.g., when math engine 236 is configured for 32-element multiplication). In some embodiments, math engine 236 is part of processing elements 104 of FIG. 1. One dimension of storage 232 is dedicated to storing channel (C) data. The other dimension of storage 232 stores linearized $F_H$, $F_W$, and K data (labeled as K in the example shown). One dimension of storage 234 is also dedicated to storing C data. The other dimension of storage 234 stores linearized H and W data (labeled as W in the example shown). Stated alternatively, the innermost (contiguous) dimension for storage 232 and storage 234 is C, the outer dimension for storage 232 is $F_H$, $F_W$, and K linearized, and the outer dimension for storage 234 is H and W linearized.

If math engine 236 is configured for 32-element multiplication, it performs 1024 multiplications and 32 row-wise adder tree computations to produce 32-element column vector 238. By storing linearized inputs, convolution can be mapped into a set of matrix multiplications. The three-dimensional convolution shown in FIG. 2a can be mapped to two-dimensional matrix multiplication. In the example illustrated, during each cycle, a row from storage 234 is broadcasted to every row in storage 232 and vector by vector multiplication is performed. An adder tree (e.g., see FIG. 2c) can be used to reduce each product vector into a single element. After broadcasting the row through all of storage 232, column vector 238 is the result. After 32 broadcasts, 32×32 matrix output 240 is the result. In some embodiments, column vector 238 is transferred to matrix output 240 and stored in transposed form. In some embodiments, matrix output 240 is stored in output storage 110 of FIG. 1. As shown, the C dimension of storage 232 and the C dimension of storage 234 have been collapsed, resulting in an output with the non-C dimensions K and W of storage 232 and storage 234, respectively. In this example, when C and K are larger than 32, math engine 236 can be fully utilized.

Figure 2C:
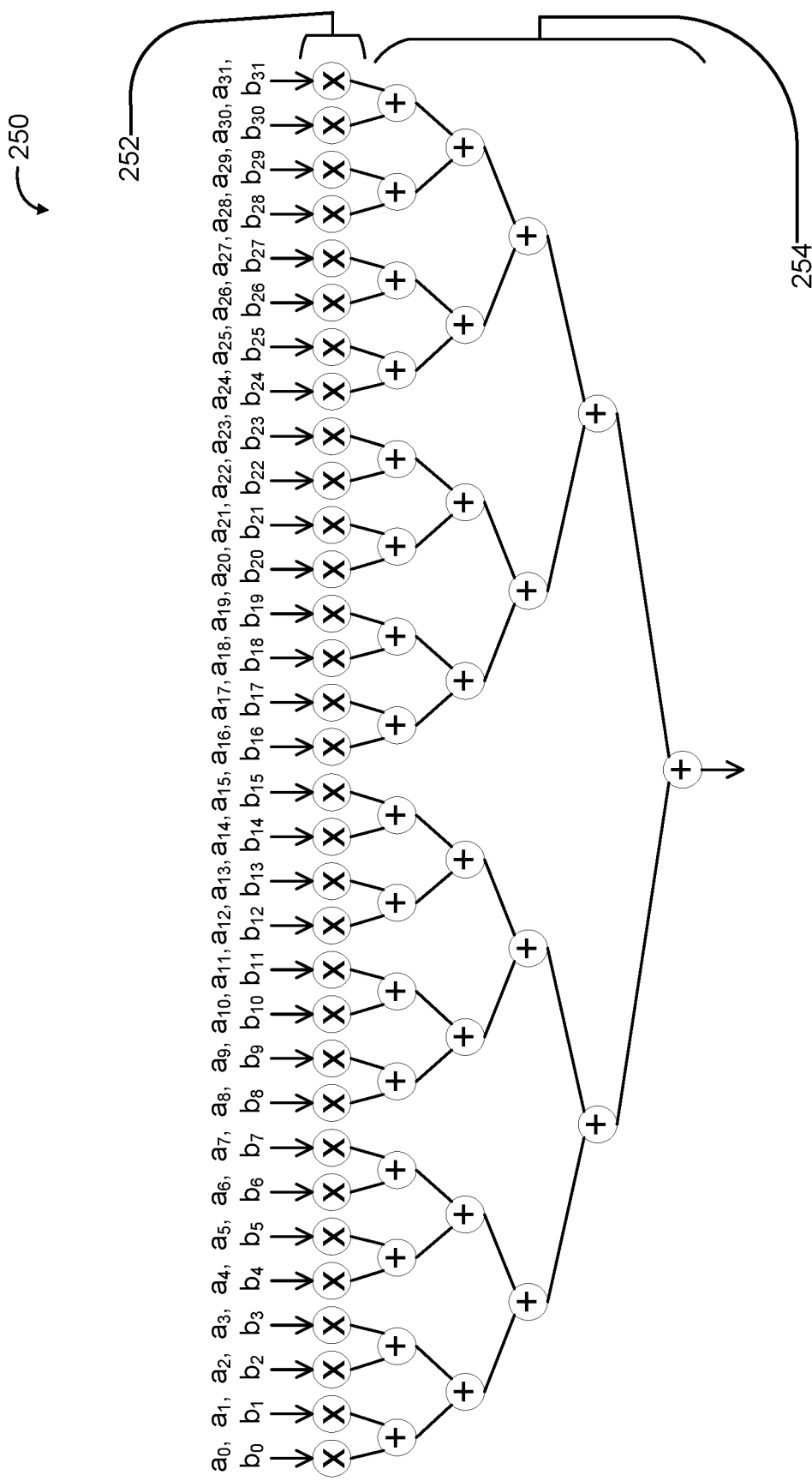
FIG. 2c is a diagram illustrating an example hardware implementation of a dot product operation associated with convolution performed via matrix multiplication.

FIG. 2c is a diagram illustrating an example hardware implementation of a dot product operation associated with convolution performed via matrix multiplication. In some embodiments, hardware implementation 250 performs the C reduction of math engine 236 in FIG. 2b. Stated alternatively, hardware implementation 250 performs element-wise multiplication of two vectors and sums the element-wise multiplied results. In the example illustrated, element-wise multiplication of two 32-element vectors is performed with multipliers 252 (comprising 32 multipliers). Various multiplier implementations known in the art may be used (e.g., serial multipliers, pipelined multipliers, combinatorial multipliers, etc.). Reduction tree 254 sums the outputs of multipliers 252. In this example, reduction tree 254 includes a hierarchical tree of adders. In various embodiments, the number of levels in the adder tree is equal to $\log_2 N$, where N is the number of elements to be summed. In various examples illustrated herein (e.g., FIG. 2b, FIG. 2c, FIG. 3b, FIG. 3c, and FIG. 4), 32-element multiplication is shown. This is illustrative and not restrictive. Multiplication of other numbers of elements (e.g., 64, 128, etc.) is also possible.

Figure 3A:
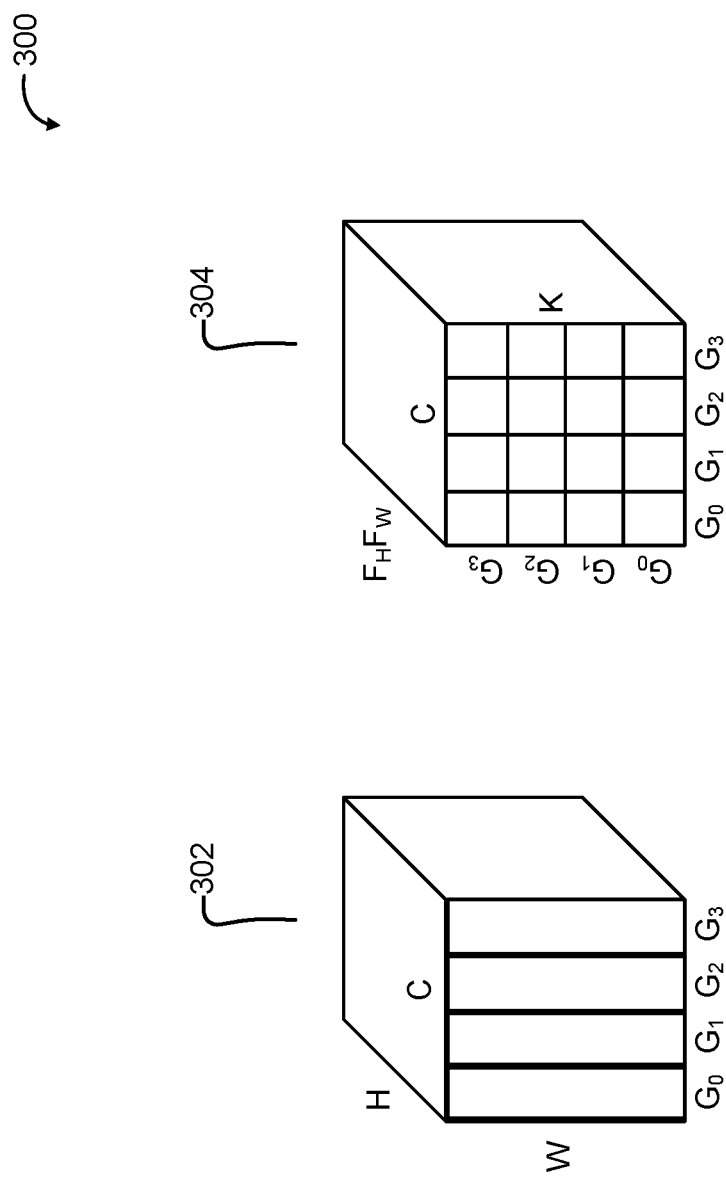
FIG. 3a is a diagram illustrating example data parameters associated with groupwise convolution.

FIG. 3a is a diagram illustrating example data parameters associated with groupwise convolution. In groupwise convolution 300, input 302 is analogous to input 202 of FIG. 2a except that data is organized as groups. Input 302 includes H, W, and C data as is the case for input 202 of FIG. 2a. In the example shown, filters 304 is analogous to filters 204 of FIG. 2a. Filters 204 includes $F_H$, $F_W$, C, and K data as is the case for filters 204 of FIG. 2a. However, input 302 and filters 304 are organized as groups. In various embodiments, for groupwise convolution, grouping is associated with C and K (not H, W, $F_H$, or $F_W$). In the example shown, input 302 is partitioned along C in groups $G_0$, $G_1$, $G_2$, and $G_3$. In the example shown, filters 304 is partitioned along C and K in two dimensions with linearized $F_H$ and $F_W$ comprising the third dimension. In the example of FIG. 2a, C could be reduced completely. In the groupwise convolution example shown, reduction of C does not occur because there is no cross-group computation. With very large C and K values, squares of data to saturate a math engine can also be produced (e.g., 32×32 squares for a math engine configured for 32-element multiplication) as in FIG. 2b. However, as described below, when C (number of input channels) and K (number of output channels) are not sufficiently large, underutilization and fragmentation can occur. There is a greater tendency for insufficiently large C and K in groupwise convolution because of the grouping and the lack of cross-group computation.

Figure 3B:
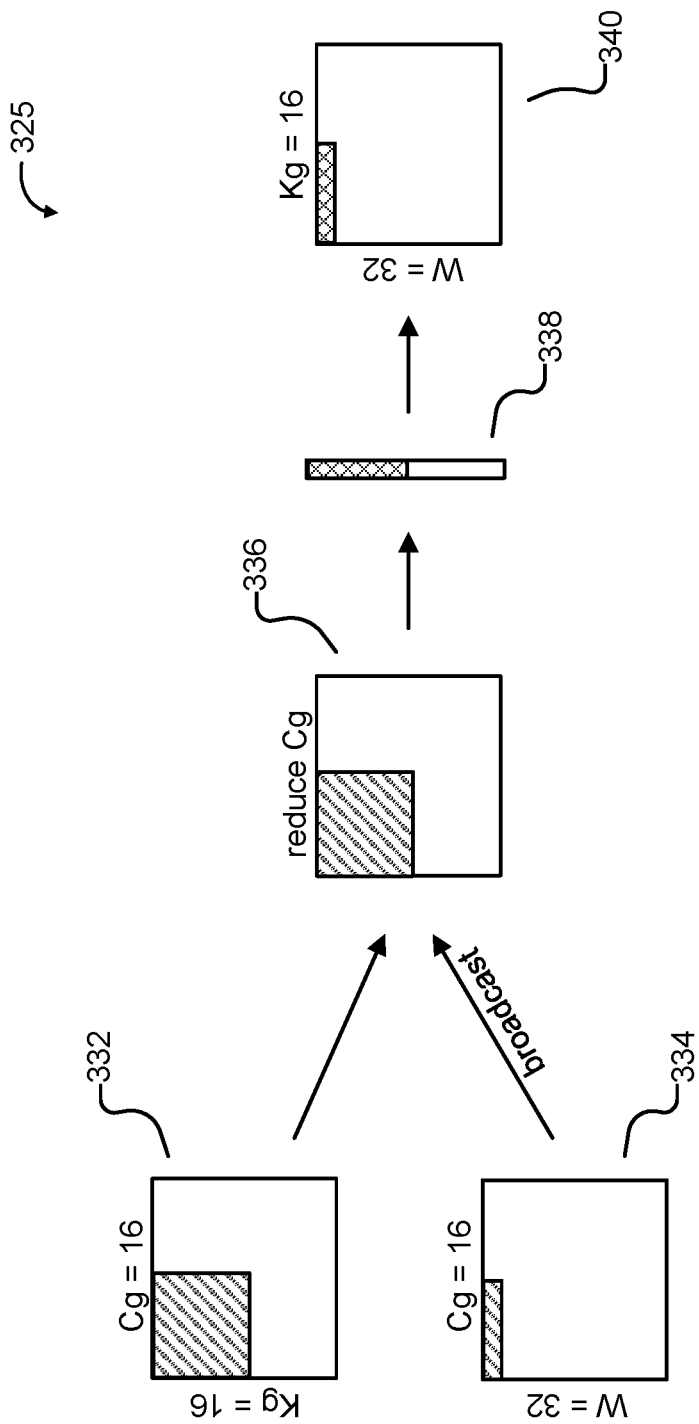
FIG. 3b is a diagram illustrating an example of an inefficient reduction of a data dimension associated with groupwise convolution due to small input and output channel sizes.

FIG. 3b is a diagram illustrating an example of an inefficient reduction of a data dimension associated with groupwise convolution due to small input and output channel sizes. For reduction 325, suppose the number of input channels Cg is 16 and the number of output channels Kg is also 16. Because there is no cross-group computation, a 16×16 square of filters is stored in storage 332 and a 1×16 row of activations is broadcasted from storage 334 (compare with the 32×32 square and 1×32 row in FIG. 2b). Consequently, math engine 336 (configured for 32×32 data in the example illustrated, as in FIG. 2b) cannot be fully utilized (only 25% utilized in the example shown). Math engine 336 (as is the case with math engine 236 of FIG. 2b) collapses the input channel (Cg) dimension. In this groupwise convolution example, due to the underutilization of math engine 336, only a 16-element column vector 338 is produced (compare with the 32-element column vector in FIG. 2b). In the example shown, column vector 338 is transferred to matrix output 340 and stored in transposed form.

As illustrated here, insufficiently large Kg leads to unused space towards the right end of matrix output 340, which when written to memory, produces gaps (internal fragmentation) in the innermost dimension of the output tensor. Another potential problem is that when utilization is 25%, at least one operand needs to be padded with zeros. For cache lines that are designed for 32 elements, only the first 16 elements would be valid. If groupwise convolution is followed by another type of convolution (e.g., normal convolution), additional processing is needed to remove zero-padding in the input operand.

Figure 3C:
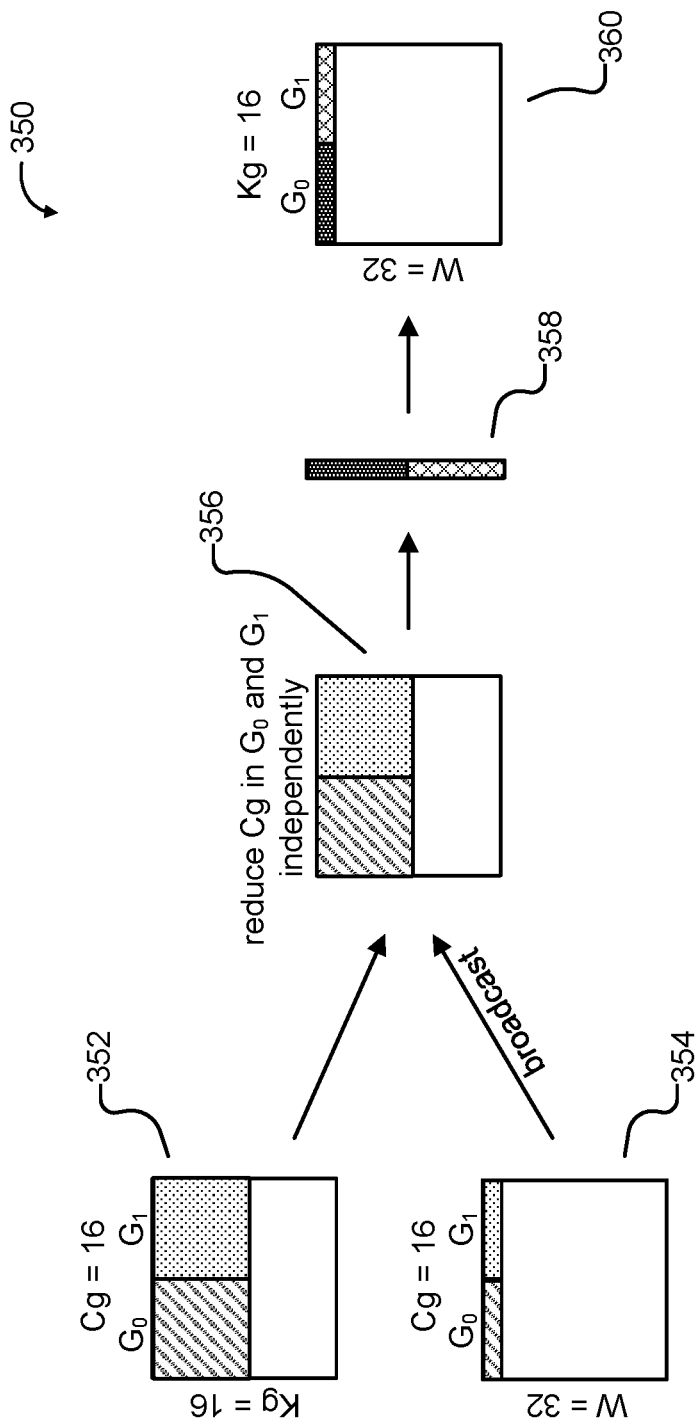
FIG. 3c is a diagram illustrating an example of a more efficient reduction of a data dimension associated with groupwise convolution with small input and output channel sizes.

FIG. 3c is a diagram illustrating an example of a more efficient reduction of a data dimension associated with groupwise convolution with small input and output channel sizes. Low utilization and output fragmentation occur in the example of FIG. 3b because the per-group number of input and output channels are not sufficiently large to saturate the math engine. Utilization can be increased and fragmentation reduced by creating two logically independent parts and mapping two independent groups to the two parts. In the example shown, for reduction 350, with Cg=Kg=16, two groups, $G_0$ and $G_1$, are packed along the Cg dimension in storage 352 and storage 354 as opposed to a single group in storage 332 and storage 334 of FIG. 3b. In some embodiments, storage 352 and 354 are input storage A 106 and input storage 108 of FIG. 1, respectively, or vice versa. Math engine utilization improves twofold with this type of packing in which each row in math engine 356 produces two results. Furthermore, column vector 358 is filled with useful results, which are then stored in matrix output 360 transposed. In some embodiments, math engine 356 is part of processing elements 104 of FIG. 1. In some embodiments, matrix output 360 is stored in output storage 110 of FIG. 1. As described below, the packing scheme shown requires modifications to hardware implementation 250 of FIG. 2c.

Packing more groups into the math engine to improve efficiency for use with hardware implementation 250 of FIG. 2c is problematic because each row of activations (e.g., in storage 354) is broadcasted to all 32 rows of the weights (e.g., storage 352) and the reduction tree in the math engine (e.g., reduction tree 254 of FIG. 2c) reduces each row to a single value. Stated alternatively, the adder tree of hardware implementation 250 of FIG. 2c would not work because it is configured to reduce across 32 elements. As described below (e.g., see FIG. 4), the hardware implementation can be modified to support grouped reductions to allow packing of additional groups to improve utilization and reduce fragmentation.

Figure 4:
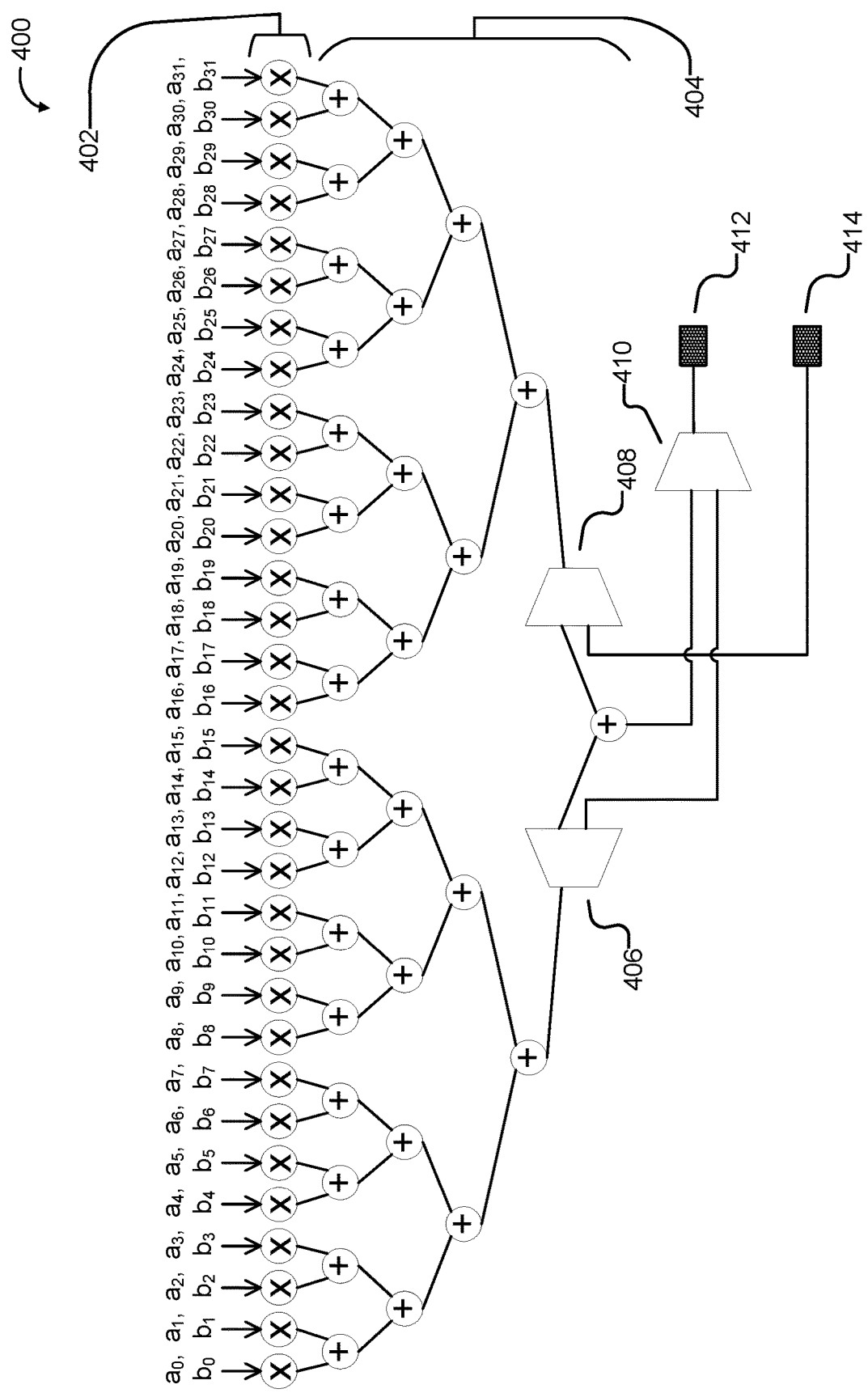
FIG. 4 is a diagram illustrating an example hardware implementation of a dot product operation that includes support for small channel sizes.

FIG. 4 is a diagram illustrating an example hardware implementation of a dot product operation that includes support for small channel sizes. In some embodiments, hardware implementation 400 performs the reductions (associated with dot product operations) in math engine 356 of FIG. 3c. In some embodiments, hardware implementation 400 replaces hardware implementation 250 of FIG. 2c to support groupwise convolution (e.g., as shown in FIG. 3a and FIG. 3c) as well as normal convolution (e.g., as shown in FIGS. 2a-2b). Multipliers 402 corresponds to multipliers 252 in FIG. 2c. In the example shown, reduction tree 404, a hierarchical adder tree, is a modified version of reduction tree 254 of FIG. 2c. In the example shown, the adder tree is broken up with multiplexers and demultiplexers so that results can be pulled from the next to last level of the adder tree in addition to the last level of the adder tree.

In the example illustrated, demultiplexer 406 receives the output from the left adder of the next to last level of adders and demultiplexer 408 receives the output from the right adder of the next to last level of adders. The output of the left adder corresponds to a reduction value of $G_0$ in FIG. 3c and the output of the right adder corresponds to a reduction value of $G_1$ in FIG. 3c. Thus, hardware implementation 400 can produce two independent reduction results if data routing of outputs of the next to last level in the adder tree is performed. To support groupwise convolution, the left half of the inputs to multipliers 402 are associated with one group (e.g., $G_0$ in FIG. 3c) for reduction and the right half of the inputs to multipliers 402 are associated with another group (e.g., $G_1$ in FIG. 3c) so that the output of the left next to last level adder corresponds to the first group and the output of the right next to last level adder corresponds to the other group.

In the example shown, demultiplexers 406 and 408 route the next to last level outputs to either the last level in the adder tree or to multiplexer 410. When the next to last level outputs are routed to the last level adder, the output of the last level adder corresponds to a single reduction value, which can be used if the math engine is saturated (e.g., for the normal convolution in FIG. 2b). In the example illustrated, multiplexer 410 selects between the output of the last level adder or the output of the left next to last level adder to be placed in storage 412. If a single reduction is desired (e.g., for normal convolution), the output of the last level adder (final result of the hierarchical tree of adders) should be selected. If two independent reductions for groupwise convolution are desired, the output of the left next to last level adder should be transferred to storage 412 and the output of the right next to last level adder should be transferred to storage 414 (because two independent reductions require two storage locations).

In some embodiments, storage 412 and 414 are temporary registers. Storage 412 and 414 may also be static random-access memory. The contents of storage 412 and 414 may be transferred to a column vector output (e.g., column vector 238 of FIG. 2b or column vector 358 of FIG. 3c) and/or matrix output storage (e.g., matrix output 240 of FIG. 2 or matrix output 360 of FIG. 3c). In some embodiments, the matrix output storage is a register array. Control signals are needed to indicate to the multiplexers and demultiplexers which results to pull (e.g., to indicate the size of the reduction dimension). For example, a signal for normal convolution (e.g., a single group of 32 elements) can be sent to demultiplexers 406 and 408 to route next to last level adder tree outputs to the last level adder and sent to multiplexer 410 to select the result from the last level adder. For groupwise convolution support (e.g., two groups of 16 elements), the signal can be inverted to direct demultiplexer 406 to route the left next to last level adder tree output to multiplexer 410, direct demultiplexer 408 to route the right next to last level adder tree output to storage 414, and direct multiplexer 410 to select the left next to last level adder tree output of demultiplexer 406 to send to storage 412. For purposes of clarity of illustration, these control signals are not drawn explicitly in FIG. 4. In some embodiments, one or more control signals are provided by control unit 126 of FIG. 1.

The example shown is illustrative and not restrictive. Various other data routing configurations can be used (e.g., using different combinations of multiplexers and demultiplexers or with other logic circuits). In addition, control circuitry can be added at other levels in the adder tree. In the example illustrated, control circuitry (e.g., multiplexers and demultiplexers) is inserted at the next to last level where there are two adders to produce two reduction values corresponding to two independent groups. If four reduction values corresponding to four independent groups are desired, control circuitry can be inserted one level above the next to last level in the adder tree where there are four adders. Stated alternatively, control circuity can be added at any level that exists in the adder tree to pull intermediate results corresponding to reduction of groups of size 2, 4, . . . , and up to $2^{N-1}$, where N is the number of levels in the adder tree. The hardware implementation illustrated improves utilization from 25% to 50%, which translates to increased energy efficiency.

Figure 5A:
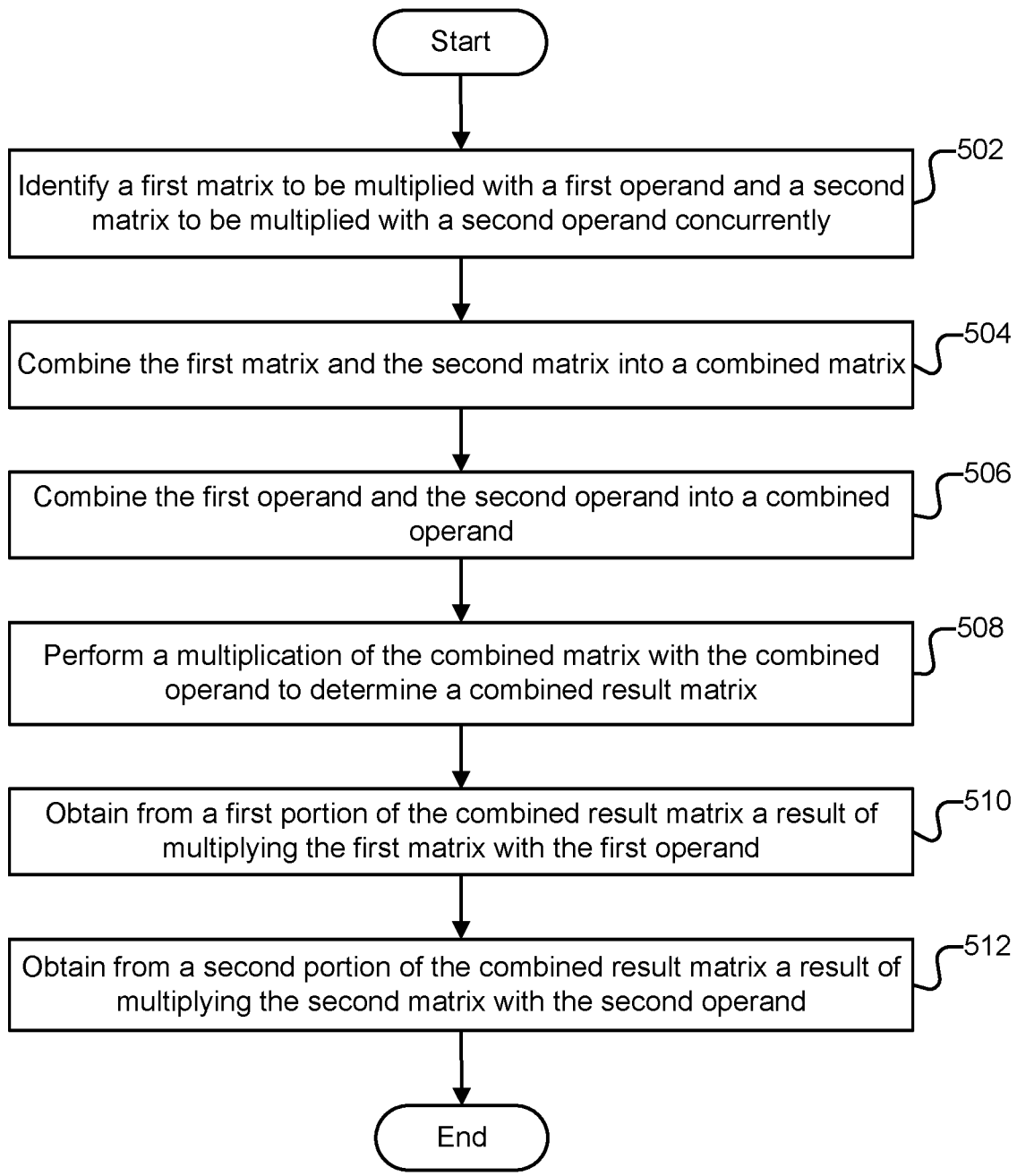
FIG. 5a is a flow chart illustrating an embodiment of a process for performing matrix multiplication that includes zero-padding in software.

FIG. 5a is a flow chart illustrating an embodiment of a process for performing matrix multiplication that includes zero-padding in software. In various embodiments, this process includes pre-storing zeros and weights in memory (e.g., random-access memory, read-only memory, flash memory, etc.) so that the zeros and weights multiplied with inputs produce correct results. In some embodiments, the memory is memory 124 of FIG. 1. This technique is similar to the technique illustrated in FIG. 3c and FIG. 4 in that throughput of the math engine can be increased by packing multiple groups together. Pre-storing zeros and weights in memory can result in more memory being used (e.g., see FIG. 5b) compared with the implementation associated with FIG. 3c and FIG. 4.

At 502, a first matrix to be multiplied with a first operand and a second matrix to be multiplied with a second operand concurrently are identified. In various embodiments, the two matrix multiplications are performed concurrently using a same dedicated matrix multiplication hardware unit configured to perform a multiplication of a matrix that is larger in size than the first matrix and the second matrix. In some embodiments, a multiplication hardware unit configured to perform multiplication of 32×32 matrices (e.g., math engine 356 of FIG. 3c) is used. The first matrix and the second matrix can be 16×16 matrices (as is the case for the examples in FIG. 3c and FIG. 4). Thus, in some embodiments, the process of FIG. 5a produces the same outputs as in FIG. 3c and FIG. 4.

Figure 5B:
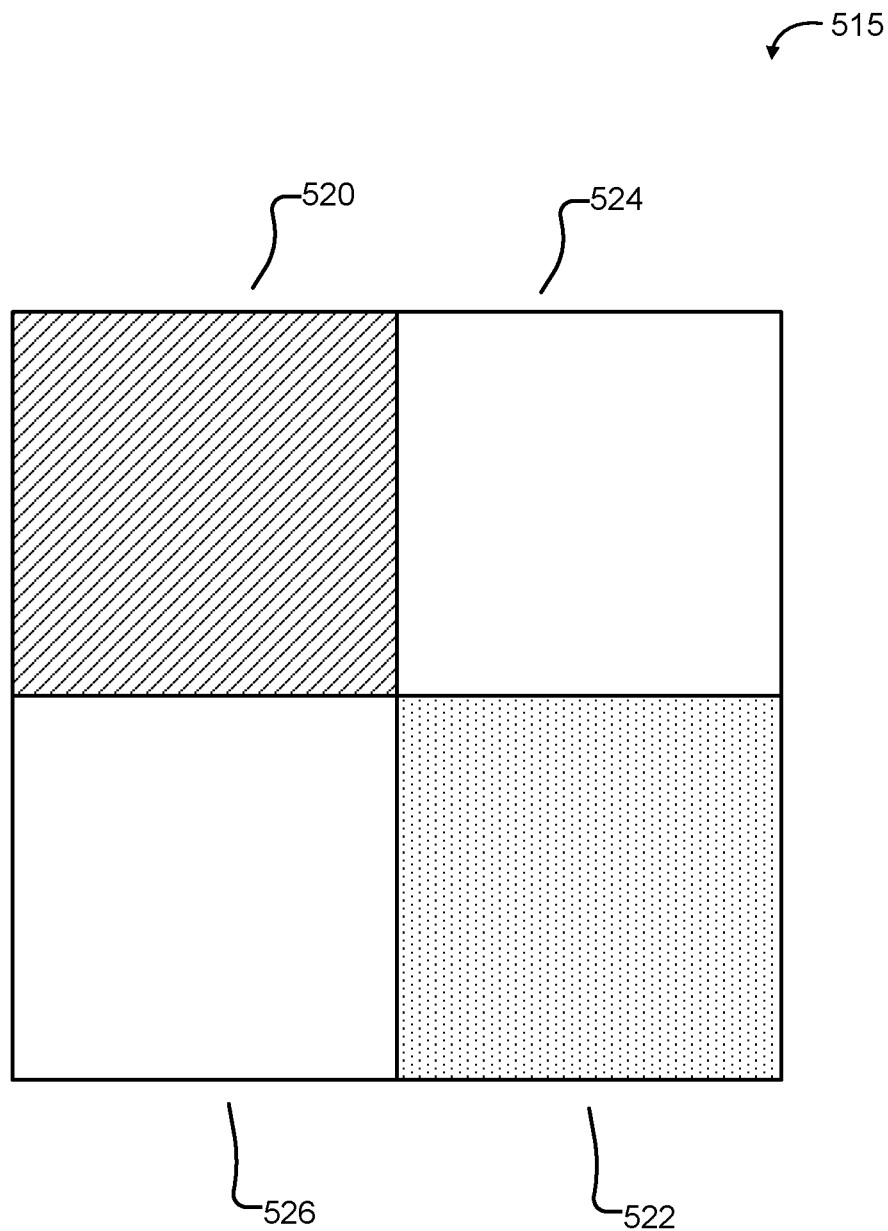

At 504, the first matrix and the second matrix are combined into a combined matrix. In various embodiments, the combined matrix includes zero-padded elements and a first group of elements of the combined matrix corresponding to the first matrix that do not share a column or a row of the combined matrix with a second group of elements of the combined matrix corresponding to the second matrix. FIG. 5b is a diagram illustrating an example of a combined matrix. In the example shown in FIG. 5b, combined matrix 515 includes portions 520, 522, 524, and 526. In the example shown, portion 520 stores the first matrix and portion 522 stores the second matrix. Portions 524 and 526 store zeros (are zero-padded). For example, combined matrix 515 may be a 32×32 matrix in which portions 520 and 522 are 16×16 data squares. Stated alternatively, portion 520 may correspond to a first 16×16 $G_0$ group and portion 522 may correspond to a second 16×16 $G_1$ group. The storing of zero-padded portions in memory represents additional memory usage compared with the example of FIG. 3c in which no zero-padded portions are stored in memory (e.g., memory 124 of FIG. 1). In the FIG. 3c example, only non-zero data needs to be stored in memory and then transferred to storage (e.g., input storage A 106 and input storage B 108 of FIG. 1) associated with the math engine.

At 506, the first operand and the second operand are combined into a combined operand. In various embodiments, the operands are the counterparts with which the first and second matrices are multiplied. The first matrix and second matrix are multiplied with the first operand and second operand, respectively, in a way analogous to the multiplication of the contents of storage 352 and storage 354 in FIG. 3c. For example, the combined operand can be operands of different groups stored adjacent to each other in memory in a similar manner that $G_0$ and $G_1$ data are stored adjacent to each other in storage 354 of FIG. 3c. Because the combined matrix is zero-padded, the combined operand does not need to be zero-padded. The $G_0$ portion of the combined operand can be stored so that it aligns with and multiplies with either the $G_0$ portion of the combined matrix or a zero-padded portion so as not to generate erroneous results. Similarly, the $G_1$ portion of the combined operand can be stored so that it aligns with and multiplies with either the $G_1$ portion of the combined matrix or a zero-padded portion.

At 508, a multiplication of the combined matrix with the combined operand is performed to determine a combined result matrix. In various embodiments, the dedicated matrix multiplication hardware unit is used to determine the combined result matrix. Because the combined matrix includes half zeros, the combined result matrix also includes at least half zeros. In various embodiments, the combined result matrix has the same layout as the combined matrix. For example, if the combined matrix has the layout shown in FIG. 5b, the combined result matrix will also have a layout where non-zero data is located in the upper left and lower right quadrants and zeros are located in the other two quadrants.

At 510, a result of multiplying the first matrix with the first operand is obtained from a first portion of the combined result matrix. In some embodiments, the result of multiplying the first matrix with the first operand is located in an upper left portion of the combined result matrix (e.g., in the same relative position as portion 520 of FIG. 5b).

At 512, a result of multiplying the second matrix with the second operand is obtained from a second portion of the combined result matrix. In some embodiments, the result of multiplying the second matrix with the second operand is located in a lower right portion of the combined result matrix (e.g., in the same relative position as portion 522 of FIG. 5b).

FIG. 5b is a diagram illustrating an example of a combined matrix in accordance with the process of FIG. 5a. See the discussion above with respect to FIG. 5a. As described above, in various embodiments, the layout of the combined result matrix is the same as that illustrated in FIG. 5b (data in portions corresponding to portions 520 and 522 and zeros in portions corresponding to portions 524 and 526) because the zeros in the combined matrix when multiplied with operands produces zeros in the combined result matrix.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a matrix multiplication hardware unit configured to perform matrix multiplications of a first size, comprising:
a plurality of multipliers configured to element-wise multiply a first group of elements with a second group of elements; and
a hierarchical tree of adders configured to add together results of the plurality of multipliers and selectively provide a final result of the hierarchical tree of adders or any of a plurality of intermediate results of the hierarchical tree of adders for use in determining an output result matrix, wherein the hierarchical tree of adders includes a demultiplexer configured to receive an output of an adder in a next-to-last level of adders in the hierarchical tree of adders, wherein the demultiplexer is configured to provide an output that is an input to an adder in a last level of adders in the hierarchical tree of adders; and
a control unit configured to instruct the matrix multiplication hardware unit to perform a plurality of different matrix multiplications of a second size smaller than the first size in parallel by using a combined matrix that includes elements of a plurality of different operand matrices and utilize one or more selected ones of the intermediate results of the hierarchical tree of adders for use in determining the output result matrix that includes different groups of elements representing different multiplication results corresponding to different ones of the different operand matrices.

2. The system of claim 1, wherein the first group of elements is associated with convolution filter values and the second group of elements is associated with input values to be convolved with the convolution filter values, or vice versa.

3. The system of claim 1, wherein the first group of elements and the second group of elements include color channel data.

4. The system of claim 1, wherein the first group of elements and the second group of elements are loaded from a memory and stored in registers.

5. The system of claim 1, wherein the first group of elements and the second group of elements include data associated with a neural network computation.

6. The system of claim 1, wherein the plurality of multipliers includes thirty-two multipliers.

7. The system of claim 1, wherein the hierarchical tree of adders includes a number of hierarchical levels of adders equal to logarithm base two of the number of multipliers in the plurality of multipliers.

8. The system of claim 1, wherein the hierarchical tree of adders includes five hierarchical levels.

9. The system of claim 1, wherein the output result matrix is stored in a register array and transferred to a memory.

10. The system of claim 1, wherein the plurality of intermediate results is two intermediate results.

11. The system of claim 1, wherein the plurality of intermediate results are outputs of adders in the next-to-last level of adders in the hierarchical tree of adders.

12. The system of claim 1, wherein the matrix multiplication hardware unit further comprises one or more multiplexers.

13. The system of claim 1, wherein an output of the adder in the last level of adders in the hierarchical tree of adders is an input to a multiplexer having another input that is another output of the demultiplexer.

14. The system of claim 1, wherein the control unit is configured to transfer the elements of the plurality of different operand matrices from a memory to registers.

15. The system of claim 1, wherein the control unit is configured to transfer the elements of the plurality of different operand matrices from registers to the matrix multiplication hardware unit.

16. The system of claim 1, wherein the control unit is configured to send one or more control signals to one or more multiplexers and demultiplexers in the matrix multiplication hardware unit.

17. A method, comprising:
element-wise multiplying a first group of elements with a second group of elements using a plurality of multipliers belonging to a matrix multiplication hardware unit configured to perform matrix multiplications of a first size;
adding together results of the plurality of multipliers using a hierarchical tree of adders belonging to the matrix multiplication hardware unit and selectively providing a final result of the hierarchical tree of adders or any of a plurality of intermediate results of the hierarchical tree of adders for use in determining an output result matrix, wherein the hierarchical tree of adders includes a demultiplexer configured to receive an output of an adder in a next-to-last level of adders in the hierarchical tree of adders, wherein the demultiplexer is configured to provide an output that is an input to an adder in a last level of adders in the hierarchical tree of adders; and
using a control unit to instruct the matrix multiplication hardware unit to perform a plurality of different matrix multiplications of a second size smaller than the first size in parallel by using a combined matrix that includes elements of a plurality of different operand matrices and utilize one or more selected ones of the intermediate results of the hierarchical tree of adders for use in determining the output result matrix that includes different groups of elements representing different multiplication results corresponding to different ones of the different operand matrices.

18. The method of claim 17, wherein the first group of elements is associated with convolution filter values and the second group of elements is associated with input values to be convolved with the convolution filter values, or vice versa.

19. The method of claim 17, wherein the first group of elements and the second group of elements include color channel data.

20. The method of claim 17, wherein the first group of elements and the second group of elements are loaded from a memory and stored in registers.

* * * * *